US010360709B2

(12) United States Patent
Rusu

(10) Patent No.: US 10,360,709 B2
(45) Date of Patent: Jul. 23, 2019

(54) RENDERING IMAGES ON MAP USING ORIENTATIONS

(71) Applicant: Microsoft Technology Licensing, LLC, Redmond, WA (US)

(72) Inventor: Andi Fabian Rusu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/479,526

(22) Filed: Apr. 5, 2017

(65) Prior Publication Data

US 2018/0293769 A1 Oct. 11, 2018

(51) Int. Cl.
| | |
|---|---|
| *G06T 11/00* | (2006.01) |
| *G06T 3/00* | (2006.01) |
| *G06T 11/60* | (2006.01) |
| *G06T 3/60* | (2006.01) |
| *G09B 29/00* | (2006.01) |
| *G01C 21/20* | (2006.01) |
| *G09B 29/10* | (2006.01) |

(52) U.S. Cl.
CPC .............. *G06T 11/60* (2013.01); *G06T 3/60* (2013.01); *G09B 29/007* (2013.01); *G01C 21/20* (2013.01); *G09B 29/106* (2013.01)

(58) Field of Classification Search
CPC ................................. G06T 11/60; G06T 3/60
USPC ....................................................... 345/634
See application file for complete search history.

(56) References Cited

U.S. PATENT DOCUMENTS

| | | | |
|---|---|---|---|
| 7,840,032 B2 * | 11/2010 | Ofek | G06T 3/4038 345/629 |
| 8,164,599 B1 * | 4/2012 | Kadous | G01C 21/20 345/629 |
| 8,315,438 B2 | 11/2012 | Bae | |
| 8,339,419 B1 | 12/2012 | Kadous et al. | |
| 8,487,957 B1 | 7/2013 | Bailly et al. | |
| 8,606,330 B2 | 12/2013 | Song et al. | |
| 9,165,339 B2 | 10/2015 | Jones | |

(Continued)

FOREIGN PATENT DOCUMENTS

EP            2400736 A1      12/2011

OTHER PUBLICATIONS

Toyama, et al., "Geographic Location Tags on Digital Images", In Proceedings of the eleventh ACM international conference on Multimedia, Nov. 2, 2003, 11 pages.

(Continued)

*Primary Examiner* — Hai Tao Sun

(74) *Attorney, Agent, or Firm* — Holzer Patel Drennan

(57) ABSTRACT

A map application is provided that allows orientations to be assigned to images such as photographs. The orientation is the direction that a real or hypothetical photographer that took the image was facing when the image was taken or created. The orientation for an image may be specified by the user, determined based on metadata associated with the image, and/or may be determined based on known features or landmarks that may be visible in the image. When an image is rendered on a map, it is displayed perpendicular to a surface of the map with the determined orientation. The amount of the image that is visible to the user depends on the orientation of the map. As the user rotates the orientation of the map, the rendered images are rotated in proportion to the rotation of the map.

17 Claims, 13 Drawing Sheets

(56) References Cited

U.S. PATENT DOCUMENTS

| | | |
|---|---|---|
| 9,411,896 B2 | 8/2016 | Frank |
| 9,465,513 B2 | 10/2016 | Sims |
| 2006/0271287 A1 | 11/2006 | Gold et al. |
| 2008/0147730 A1 | 6/2008 | Lee et al. |
| 2011/0316885 A1 | 12/2011 | Kim et al. |
| 2013/0151597 A1 | 6/2013 | Akiya et al. |
| 2013/0182108 A1* | 7/2013 | Meadow ................. G06T 17/05 348/143 |
| 2014/0218394 A1 | 8/2014 | Hochmuth et al. |
| 2015/0153933 A1 | 6/2015 | Filip et al. |

OTHER PUBLICATIONS

"International Search Report and Written Opinion Issued in PCT Application No. PCT/US2018/024236", dated Jul. 16, 2018, 12 Pages.

\* cited by examiner

RENDERING IMAGES ON MAP USING ORIENTATIONS

BACKGROUND

Map applications are a popular type of application, with a variety of uses. For example, a user may use a map application to determine directions, or may use the map application to determine restaurants, banks, drugstores, and other businesses near a current location. Map applications are commonly integrated into smartphones, tablets, and vehicle navigation systems, and may be accessed by any computing device though the Internet.

One popular use for map applications is to view images (e.g., photographs) from a user's personal image collection. Icons representing the images are arranged on the map based on locations associated with each image. Where the images are photographs, the location may be the location where each photograph was taken.

Some current map applications allow users to explore maps from a variety of perspectives by changing a zoom level of the map, changing an orientation of the map, and changing a viewing angle of map. Typically, in response to such changes, the features of the map such as roads, buildings, trees, etc., are also changed to help orient the user and to provide an enhanced user experience. For example, if the user rotates the map by 90 degrees, the representations of buildings that are visible to the user may also be rotated 90 degrees.

In contrast, images typically remain static in response to user changes to the map. For example, map applications may represent images using icons, or other static features, that may be clicked or selected by the user to view the associated image. If, after selecting an icon to view the associated image, the user makes a change to the map such as changing the orientation, the associated image is either removed from the map before the change is applied to the features of the map, or the associated image remains unchanged as the change is applied to the features of the map.

SUMMARY

A map application is provided that allows orientations to be assigned to images such as photographs. The orientation is the direction that a real or hypothetical photographer that took the image was facing when the image was taken or created. The orientation for an image may be specified by the user, determined based on metadata associated with the image, and/or may be determined based on known features or landmarks that may be visible in the image. When an image is rendered on a map, it is displayed perpendicular to a surface of the map with the determined orientation. The amount of the image that is visible to the user depends on the orientation of the map. As the user rotates the orientation of the map, the rendered images are rotated in proportion to the rotation of the map.

In an implementation, a system for determining the orientation of an image and for rendering the image on a map based on the determined orientation and an orientation of the map is provided. The system includes at least one computing device and a map engine. The map engine may be adapted to: receive a map; receive an image, wherein the image is associated with a location on the map; determine an orientation of the image; display the map on a display associated with the at least one computing device; determine an orientation of the displayed map; and render the image on the displayed map at the associated location based on the orientation of the image and the orientation of the displayed map.

In an implementation, a system for determining orientations for images and for rendering the images on a map based on the determined orientations is provided. The system may include at least one computing device and a map engine. The map engine may be adapted to: select a subset of images from a plurality of images, wherein each image of the plurality of images is associated with a location; for each image of the subset of images, determine an orientation for the image; display a map on a display associated with the at least one computing device, wherein the map is associated with an orientation and the map is associated with a plurality of locations; and for each image of the subset of images, render the image on the map at the location associated with the image based on the orientation of the image and the orientation of the map.

In an implementation, a method for rendering an image on a map based on an orientation associated with the image is provided. The method includes: receiving a map by a computing device; receiving an image by the computing device, wherein the image is associated with an orientation and a location on the map; displaying the map on a display by the computing device, wherein the displayed map is associated with an orientation; rendering the image on the displayed map at the associated location based on the orientation of the image and the orientation of the displayed map by the computing device; receiving a change to the orientation of the displayed map by the computing device; and in response to the received change to the orientation of the map, re-rendering the image on the map at the associated location based on the orientation of the image and the change to the orientation of the displayed map by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
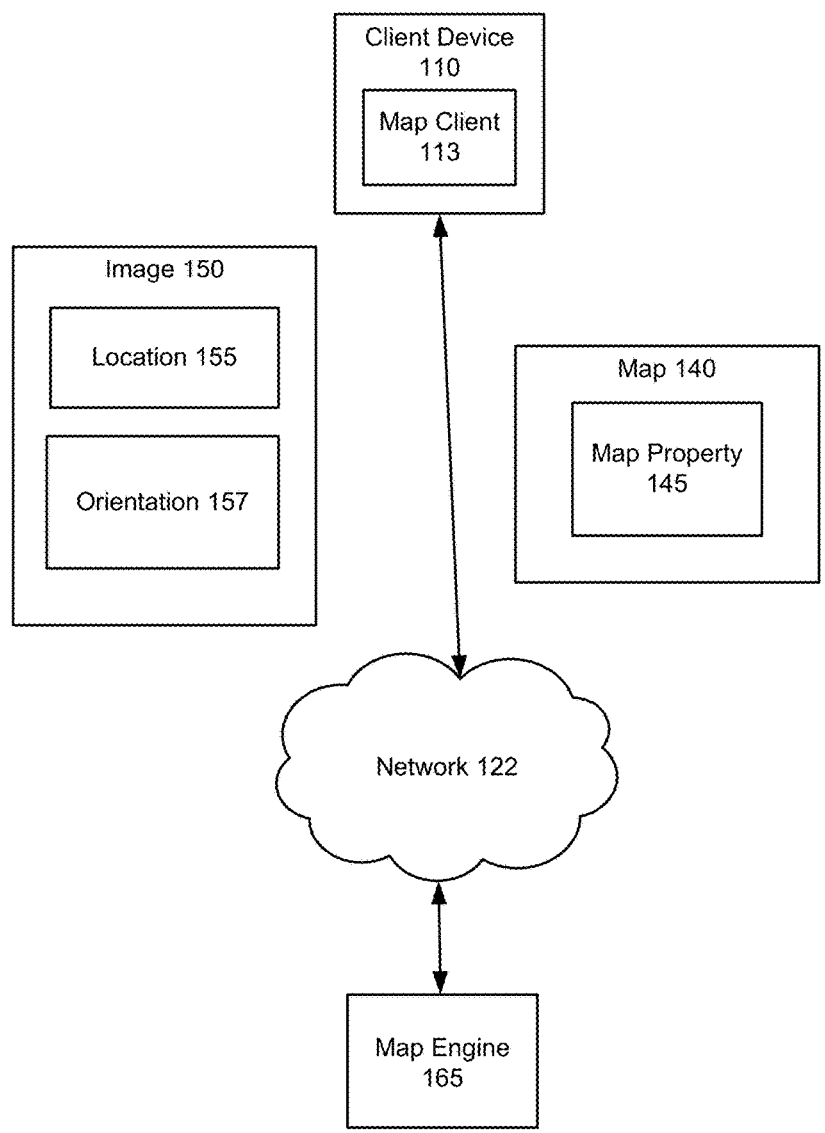
FIG. 1 is an illustration of an exemplary environment for determining orientations for images and for rendering the images on a map based on the determined orientations.

FIG. 1 is an illustration of an exemplary environment 100 for determining orientations for images and for rendering the images on a map based on the determined orientations. The environment 100 may include a map engine 165 and one or more client devices 110 in communication through a network 122. The network 122 may be a variety of network types including the public switched telephone network (PSTN), a cellular telephone network, and a packet switched network (e.g., the Internet). Although only one client device 110 and one map engine 165 are shown in FIG. 1, there is no limit to the number of client devices 110 and map engines 165 that may be supported.

Figure 13:
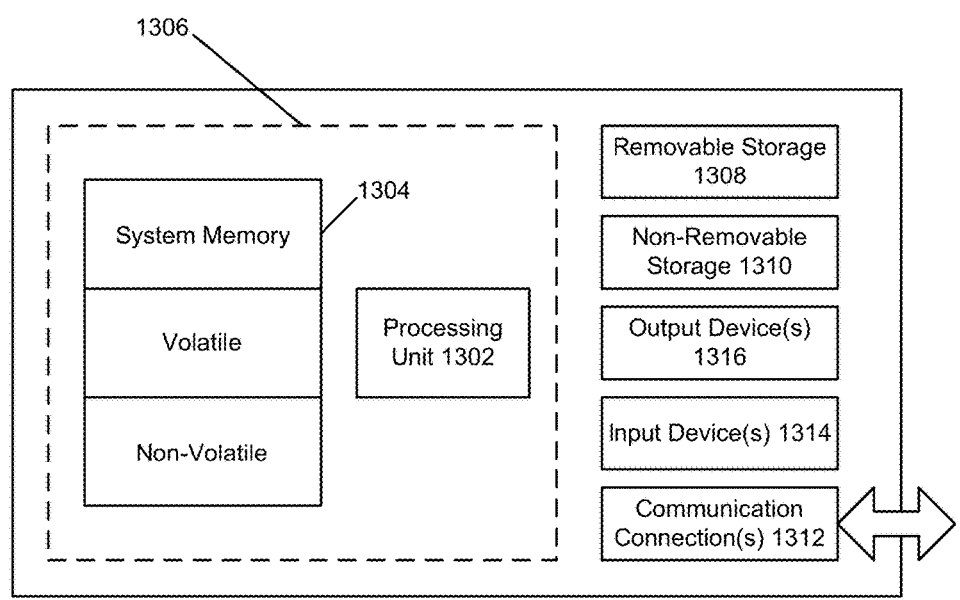
FIG. 13 shows an exemplary computing environment in which example embodiments and aspects may be implemented.

The client device 110 and the map engine 165 may be implemented using a variety of computing devices such as smart phones, desktop computers, laptop computers, tablets, vehicle navigation systems, and video game consoles. Other types of computing devices may be supported. A suitable computing device is illustrated in FIG. 13 as the computing device 1300.

Each client device 110 may further include a map client 113. The map client 113 may be used by a user of the client device 110 to view and interact with one or more maps 140. Depending on the implementation, the map client 113 may be, or may be part of, a map application. An example map application is the map application integrated into most smartphones and tablet computers.

The map client 113 may allow the user to explore a map 140 by changing what are referred to herein as map properties 145. The map properties 145 associated with a map 140 may control how the map 140 is displayed and rendered for the user by the map client 113.

One type of map property 145 is referred to herein as zoom level. The zoom level may be a measure of how close or far the user is from the map 140, and may control the level of detail that is used on the map 140 as well as how much of the map 140 is visible. A high zoom level may show a small area of the map 140, but may include a large amount of detail. A low zoom level may show a large area of the map 140, but may include a small amount of detail. For example, at a high zoom level, individual houses may be visible on a map 140, but the user may be limited to viewing a single neighborhood. At a low zoom level, the user may only see details such as major roads and highways, but the user may be able to view an entire state or country. Another way to refer to the zoom level map property 145 may be a viewing distance that represents the height at which a hypothetical viewer is viewing the displayed map 140.

Another map property 145 may include what is referred to as viewing angle. The viewing angle may be the angle at which a hypothetical user is viewing the map 140. A viewing angle of 0 degrees may indicate that the user is directly above the map 140. A viewing angle of 45 degrees may indicate that the user is viewing the map 140 from a 45 degree angle. This viewing angle may also be known as "bird's eye view". Typically, larger viewing angles may make features and objects that are close to the user on the map 140 appear to be larger than features and objects that are far from the user on the map 140. In addition, with a large viewing angle, close objects and features are more likely to obscure or block far objects and features.

Another map property 145 may include what is referred to as orientation. The orientation of the map 140 may be the cardinal orientation that the map 140 is currently being viewed in. The cardinal orientation of the map 140 may be the direction that is perpendicular to a top most edge of a display that is being used to render or display the map 140. Accordingly, for a map 140 with an orientation of north, the top edge of the display may correspond to the north direction on the map 140. For a map 140 with an orientation of southwest, the top edge of the display may correspond to the southwest direction on the map 140.

The map client 113 may display one or more images 150. An image 150 may include photographs taken by one or more users, graphics created by one or more users, or some combination of both. Any type of file or data structure that can be visually rendered by a computing device may be considered an image 150. Moreover, an image 150 may include a collection or sequence of images or pictures such as a video.

Each image 150 may be associated with a location 155. The location 155 associated with an image may be the location that the image 150 represents, captures, or includes. For example, where the image 150 is a photograph, the location 155 may be the location where the photograph was taken. Where the image 150 is a painting, the location 155 may be the location that is depicted in the painting. Thus, for a painting of the Statue of Liberty that was painted in a Los Angeles studio, the location 155 for the painting may be Liberty Island, N.Y., rather than Los Angeles. Depending on the implementation, the location 155 associated with an image 150 may be specified by a user or a creator, and/or may be included in metadata associated with the image 150.

One drawback associated with current map applications is that images 150 are not fully integrated into the user experience. Currently, when the user changes one of the map properties 145 described above for a map 140, the various features displayed on the map 140 are adjusted or skewed to reflect the changed properties. For example, when a user changes the viewing angle from a low viewing angle to a high viewing angle, the features such as buildings that are visible on the map 140 may be skewed based on their relative proximity to the user and the selected viewing angle. In another example, when a user increases the zoom level, the visible features on the map 140 may be enlarged and displayed with increased detail to reflect the increased zoom level. However, when images 150 are incorporated into map applications, currently those images 150 typically remain unchanged, or even disappear, when the user changes one or more map properties 145.

Accordingly, to solve some or all of the current drawbacks associated with maps 140 and map applications, the environment 100 may include the map engine 165. The map engine 165 may associate an orientation 157 with an image 150, and the associated orientation 157 may be used by the map engine 165 to adjust the appearance of the image 150 on the map 140 based on the map properties 145 associated with the map 140.

Depending on the implementation, the orientation 157 associated with an image 150 may represent the cardinal direction that a user viewing the image 150 would naturally face to view the image 150. Where the image 150 is a photograph, the orientation 157 may represent the direction that a user was facing when they took the photograph. For example, if a user was facing northwest when an image 150 was taken, the orientation 157 of the image 150 may be northwest.

To incorporate the orientation 157 of an image 150 onto a map 140, when an image 150 is rendered for display on the map 140, the map engine 165 may place the image 150 on the map at the location 155 associated with the image 150. In addition, the image 150 may be oriented on the map 140 according to the orientation 157. The image 150 may be oriented on the map to convey the orientation 157 to a viewer of the map 140. As may be appreciated, because the map 140 has its own orientation as a map property 145, the image 150 may be oriented on the map 140 according to the orientation 157 associated with the image 150 relative to the orientation of the map 140.

Figure 2:
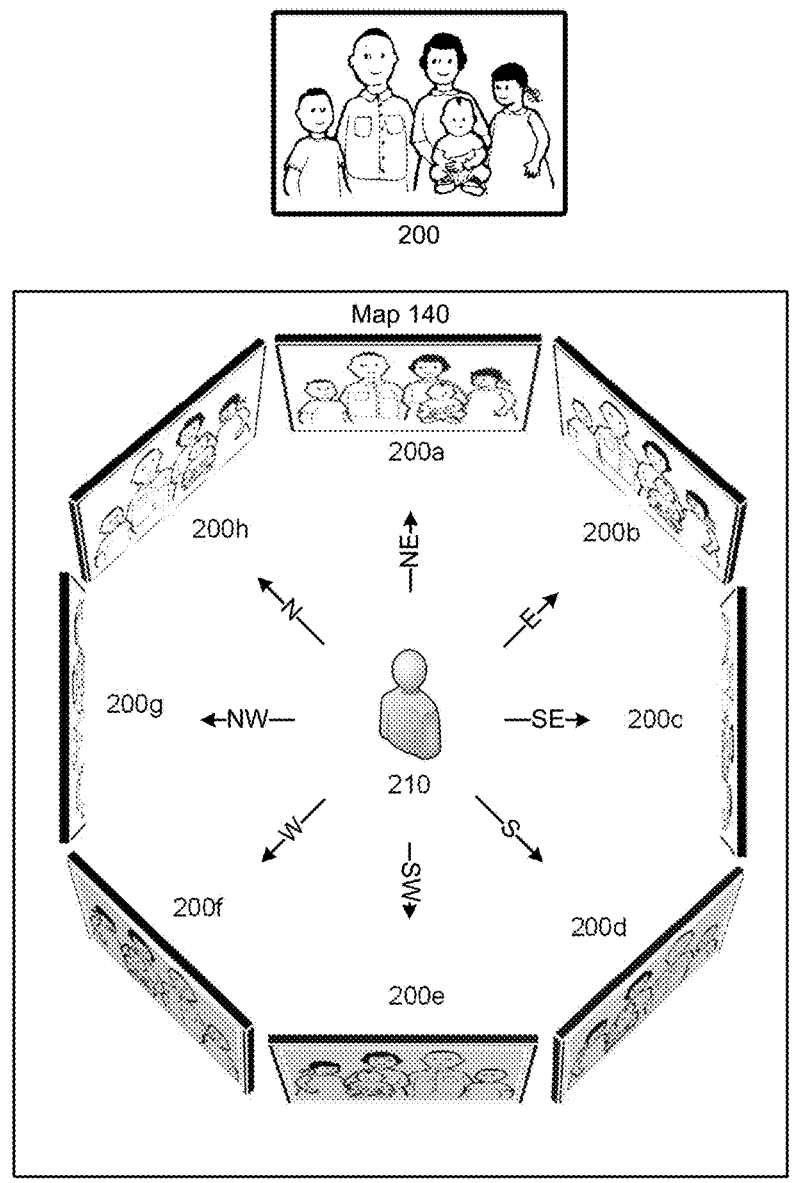
FIGS. 2 and 3 are illustrations of how an image would be rendered on a map for a variety of orientations relative to an orientation of the map.

For example, FIG. 2 is an illustration of how an image 200 would be rendered on the map 140 for a variety of orientations 157 relative to the orientation of the map 140. In the example shown, the map 140 includes direction arrows, each labeled with a different orientation 157. These labels include N, NE, E, SE, S, SW, W, and NW each corresponding to the cardinal directions of north, northeast, east, southeast, south, southwest, west, and northwest, respectively. Note that the supported orientations are not limited to the cardinal directions, but could include any direction or direction type. For example, an embodiment could use angles or polar coordinates to represent orientation. The map 140 as shown in FIG. 2 has a northeast orientation because the direction arrow labeled "NE" is pointing to the top of the map 140.

In the example shown, a version of the image 200 (i.e., the images 200a-h) is displayed for each orientation 157. Each image 200 is displayed based on the perspective of a viewer 210 for the associated orientation 157 relative to the orientation of the map 140. As described above, the orientation 157 of the image is the direction from which the image is most visible. Each image 200 is displayed on the surface of a cuboid to appear substantially perpendicular to a surface of the map 140. The images 200 may appear on the map 140 similar to "billboards" at their associated location 155.

Each of the images 200 is displayed on the map 140 as it would be rendered based on its associated orientation 157 when the map 140 has an orientation of northeast. The image 200a has an orientation 157 of northeast. The image 200b has an orientation 157 of east. The image 200c has an orientation 157 of southeast. The image 200d has an orientation 157 of south. The image 200e has an orientation 157 of southwest. The image 200f has an orientation 157 of west. The image 200g has an orientation 157 of northwest.

Note that because of their orientations, the images 200f, 200e, and 200d may not be visible to the viewer of the map 140 when the map 140 has an orientation of northeast. In the example shown, the images 200f, 200e, and 200d are rendered with the contents of the image being reversed to convey to the user that the images are being viewed from behind. Alternatively, images that are not visible because of the orientation may be rendered as a solid color or using some level of transparency.

To further incorporate the orientation 157 of images 150 into the map application, the map engine 165 may further re-render or re-display images 150 based on their orientations 157 when the orientation of the map 140 is changed. In particular, when the user changes the orientation of the map 140 by rotating the map 140, any images 150 rendered on the map 140 may be re-rendered to account for the changed orientation. Depending on the implementation, the map engine 165 may re-render the images 150 in real time, such that the images 150 may appear to rotate on the map 140 as the user changes the orientation of the map 140.

Figure 3:
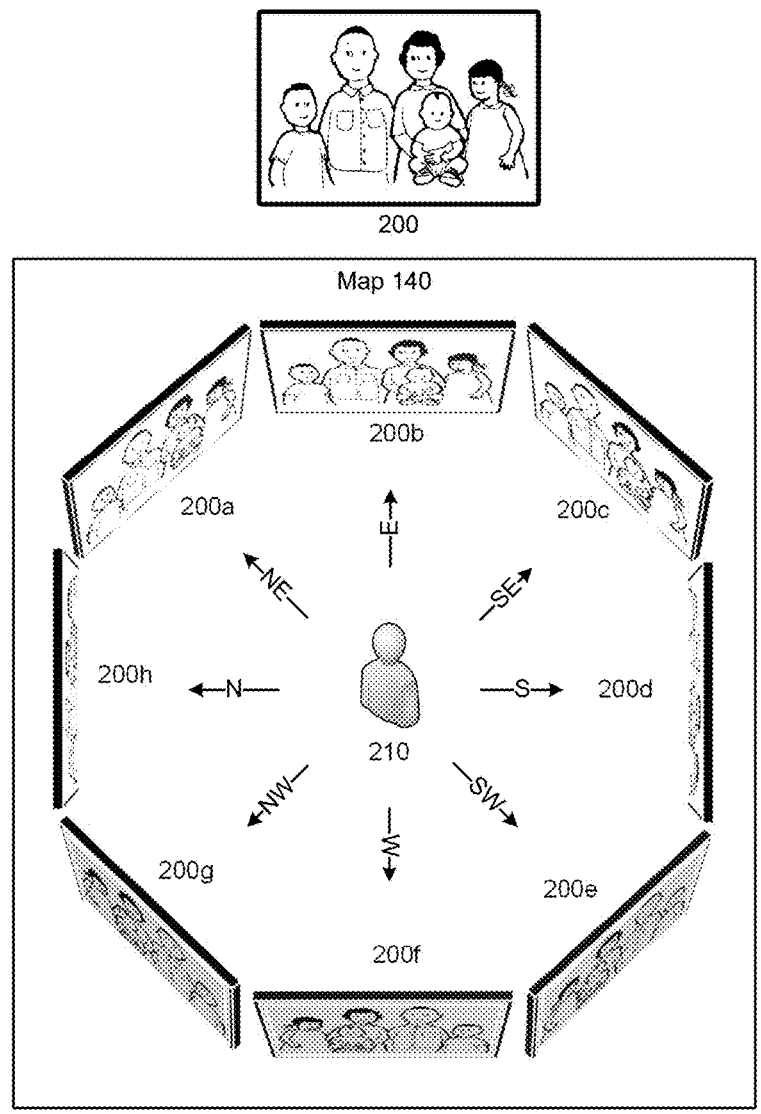

For example, FIG. 3 illustrates how the images 200 would be re-rendered based on a change of the orientation of the map 140 from northeast to east. As shown, each of the images 200 has been re-rendered to appear to rotate in the counterclockwise direction in proportion to the change in orientation of the map 140 from northeast to east. Thus, the image 200b with the orientation 157 of east now appears oriented towards the top of the map 140. Each of other images 200 has been similarly re-oriented relative to the change of the orientation of the map 140 from northeast to east.

Note that the image 200d is now visible to the user, and is now rendered with the contents of the image no longer being reversed. The image 200g is now no longer visible, and is now rendered, along with the images 200f and 200e, with the contents of the image being reversed.

Figure 4:
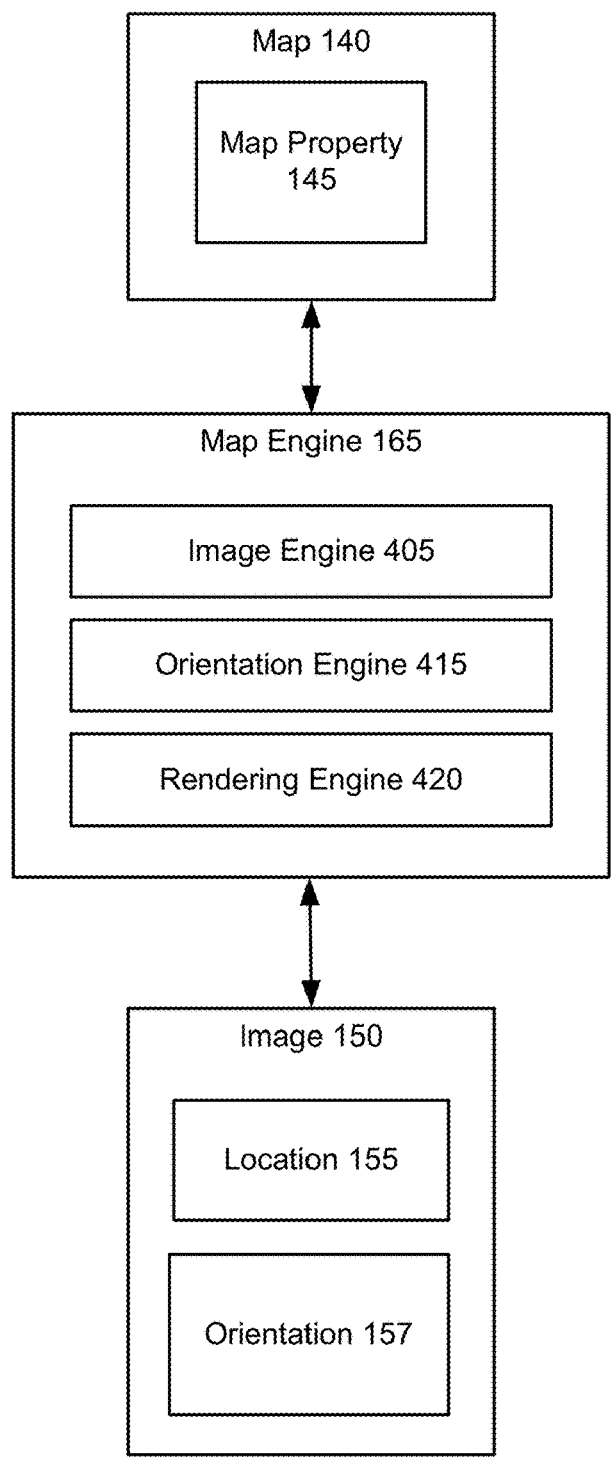
FIG. 4 is an illustration of an implementation of an exemplary map engine.

FIG. 4 is an illustration of an implementation of an exemplary map engine 165. The map engine 165 may include one or more components including an image engine 405, an orientation engine 415, and a rendering engine 420. More or fewer components may be included in the map engine 165. Some or all of the components of the map engine 165 may be implemented by one or more computing devices such as the computing device 1300 described with respect to FIG. 13. In addition, some or all of the functionality attributed to the map engine 165 may be performed by the map client 113, and vice versa.

The image engine 405 may select images 150 to include on a map 140. The images 150 may be images 150 associated with the user, or may be images 150 associated with other users. For example, a user may view images 150 that are associated with friends and contacts in a social networking application.

In some implementations, the image engine 405 may select the images 150 based on user provided criteria. The criteria may include keywords and date ranges. Other types of criteria may be supported. For example, the user may specify criteria such as images 150 of "cars" taken in the "50's." The image engine 405 may find images 150 with metadata or other information that matches the criteria provided by the user.

The image engine 405 may further select images 150 based on the locations 155 associated with the images 150. In particular, the image engine 405 may select images 150 that are likely to be visible on the map 140. For example, if the map 140 is a map of Seattle, then the image engine 405 may select images 150 that are close to Seattle or that are in Seattle.

The image engine 405 may further consider map properties 145 when selecting images 150 for a map. In particular, the image engine 405 may consider the current zoom level or viewing distance for the map 140. When the zoom level is low, indicating that the map 140 is being viewed from a high viewing distance, the image engine 405 may select images 150 that come from a variety of locations and that are not clustered together. When the zoom level is high, indicating that the map 140 is being viewed from a low distance, the image engine 405 may select images 150 that are located closer together. For example, when the user is viewing the map 140 at a zoom level where the entire United States is visible, multiple images 150 from the same city would appear on top of one another, so the image engine 405 may select one image 150 from each city for the map 140. However, when the user is zoomed into a city such as Detroit, the image engine 405 may select multiple images 150 from Detroit, or even the same neighborhood of Detroit.

The image engine 405 may further consider user preferences or rankings when selecting images 150. As may be appreciated, there may often be more images 150 available for selection than can be displayed on the map 140 without crowding or obscuring other images 150 on the map 140. Accordingly, the image engine 405 may use user preferences or rankings to select images 150 that may be pleasing to the user viewing the map 140. The user preferences or rankings may be based on information provided by the user regarding their interests (e.g., a user profile) or based on feedback provided the user (e.g., "likes", ratings, or other interest signals). The rankings may further be based on feedback provided by other users.

The orientation engine 415 may determine an orientation for each image 150 selected by the image engine 405. The orientation 157 of an image 150 is the direction that a hypothetical viewer would face to directly view the image 150. In some implementations, the orientation engine 415 may determine the orientation 157 based on metadata associated with the image 150. For example, for images 150 such as digital photographs, the orientation engine 415 may determine the orientation 157 of the image 150 based on Exchangeable Image File Format ("EXIF") data associated with the image 150. When a digital photograph is taken, the digital camera may record the orientation 157 of the camera, and may add the orientation 157 of the camera to the EXIF data associated with the digital photograph. Other information in the EXIF data may include aperture size, shutter speed, resolution, and the location 155 of where the image 150 was taken.

Where the EXIF data is unavailable, the orientation engine 415 may determine the orientation 157 of an image 150 by processing the image 150 to look for objects or clues that may be used to determine the orientation 157. As described above, the location 155 of the image 150 may be known. In some implementations, the orientation engine 415 may determine the orientation 157 of the image 150 by comparing the image 150 with other images 150 that are associated with the same or similar location 155 and that have known orientations 157. If an image 150 is similar to another image 150 with the same location 155, then the images 150 are likely to have the same orientation 157. The other images 150 used for comparison may be images 150 associated with the user of the map engine 165, or other users.

In another implementation, the orientation engine 415 may determine the orientation 157 of an image 150 using object recognition. The orientation engine 415 may process the image 150 to determine known objects that are visible in the image 150 based on the location 155 associated with the image 150. The objects may include landmarks, for example. Given that the objects are also associated with locations, the locations of the visible objects and the location 155 of the image 150 may be used to determine the orientation 157 of the image 150. For example, the orientation engine 415 may determine that the image 150 has a location 155 that is near the Westlake Center in Seattle. The orientation engine 415 may process the image 150 for objects, and may determine that the Space Needle is visible in the image 150. Based on the location 155 of the Westlake Center and the location 155 of the Space Needle, the orientation engine 415 may determine that the orientation 157 of the image 150 is northwest.

Other methods for determining the orientation of an image 150 may be used. For example, where the time that the image 150 was taken is known, or approximately known, the position of the sun or moon (if visible) in the image 150 can be used in combination with the location 155 to determine the orientation 157 of the image 150. Similarly, the direction of shadows that are visible in the image 150 can be used to determine the orientation 157.

Depending on the implementation, after the orientation engine 415 determines the orientation 157 of an image 150 using objects or similar images 150, the orientation engine 415 may prompt the user to confirm the orientation 157 before associating the orientation 157 with the image 150. Continuing the example above, the orientation engine 415 may display a user interface element that asks the user to confirm that the orientation 157 of the image 150 is northwest. Alternatively, the orientation engine 415 may not prompt the user to confirm the orientation 157, or may prompt the user to confirm the orientation 157 when a confidence associated with the determined orientation 157 is below a threshold confidence. The threshold confidence may be set by a user or an administrator.

The rendering engine 420 may render the selected images 150 on the map 140 based on the determined orientations 157 and the map properties 145. For a map property 145 such as the orientation of the map 140, the map engine 165 may render each image 150 on the map 140 at the location 155 associated with the image 150 in a way that conveys the associated orientation 157 to the user relative to the orientation of the map 140. Depending on the implementation, each image 150 may be rendered on the map 140 on a surface of a cuboid similar to a "billboard" having the orientation 157.

The rendering engine 420 may also render the selected images 150 on the map 140 based on other map properties 145 such as the viewing angle and zoom level. For viewing angle, the rendering engine 420 may render each image 150 on the map 140 so that the image 150 appears to be substantially perpendicular to a surface of the map 140. As may be appreciated, the viewing angle of the map 140 may cause the surface of the map 140 to appear to be tilted toward or away from the user. Accordingly, to make a rendered image 150 appear to be perpendicular to the surface of the map, the rendered image 150 may similarly be tilted or skewed based on the viewing angle.

For zoom level, the rendering engine 420 may render each image 150 on the map 140 so that the size of each image 150 is proportional to the zoom level. Depending on the implementation, when the zoom level is increased, the size of each image 150 on the map 140 may be similarly increased. When the zoom level is decreased, the size of each image 150 on the map 140 may be similarly decreased. The initial size of each image 150 on the map 140 may be determined based on factors such as the original zoom level, the number of images 150 on the map 140, and user settings or preferences.

The rendering engine 420 may receive a change to one or more of the map properties 145 of the map 140, and in response to the received change, may re-render each image 150 on the map 140 to account for the received change. For example, when the user changes the orientation of the map 140 by rotating the map 140 by 45 degrees, each image 150 on the map 140 may similarly be rotated by 45 degrees. When the user changes the viewing angle of the map 140 by 10 degrees, each image 150 on the map 140 may be tilted or skewed to account for the change in viewing angle based on the location 155 of each image 150. When the user changes the zoom level of the map 140, the size of each image 150 on the map 140 may be adjusted in proportion to the change in the zoom level.

Depending on the implementation, the images 150 on the map 140 may be re-rendered in real time as the user the makes the changes to the map 140, so that the images 150 appear to be a part of the map 140. For example, as the user changes the orientation of the map 140 by rotating the map 140 using one or more user interface elements, the images 150 rendered on the map 140 may appear to rotate along with the map 140.

By rendering the images 150 on the map based on the orientations 157, the user is encouraged to interact with the map 140 to get a better view of the images 150. For example, an image 150 with an orientation 157 of northwest may be rendered on a map 140 initially having a north orientation. The user may desire to get a better view of the image 150, and may rotate the orientation of the map 140 such that the map 140 has the same orientation as the image 150 (i.e., northwest). Because the user is now viewing the map 140 with the same orientation as the image 150, the user may better understand the area of the map 140 portrayed in the image 150 and how that area fits into the various roads, structures, and other landmarks that are also rendered on the map 140.

Figure 5:
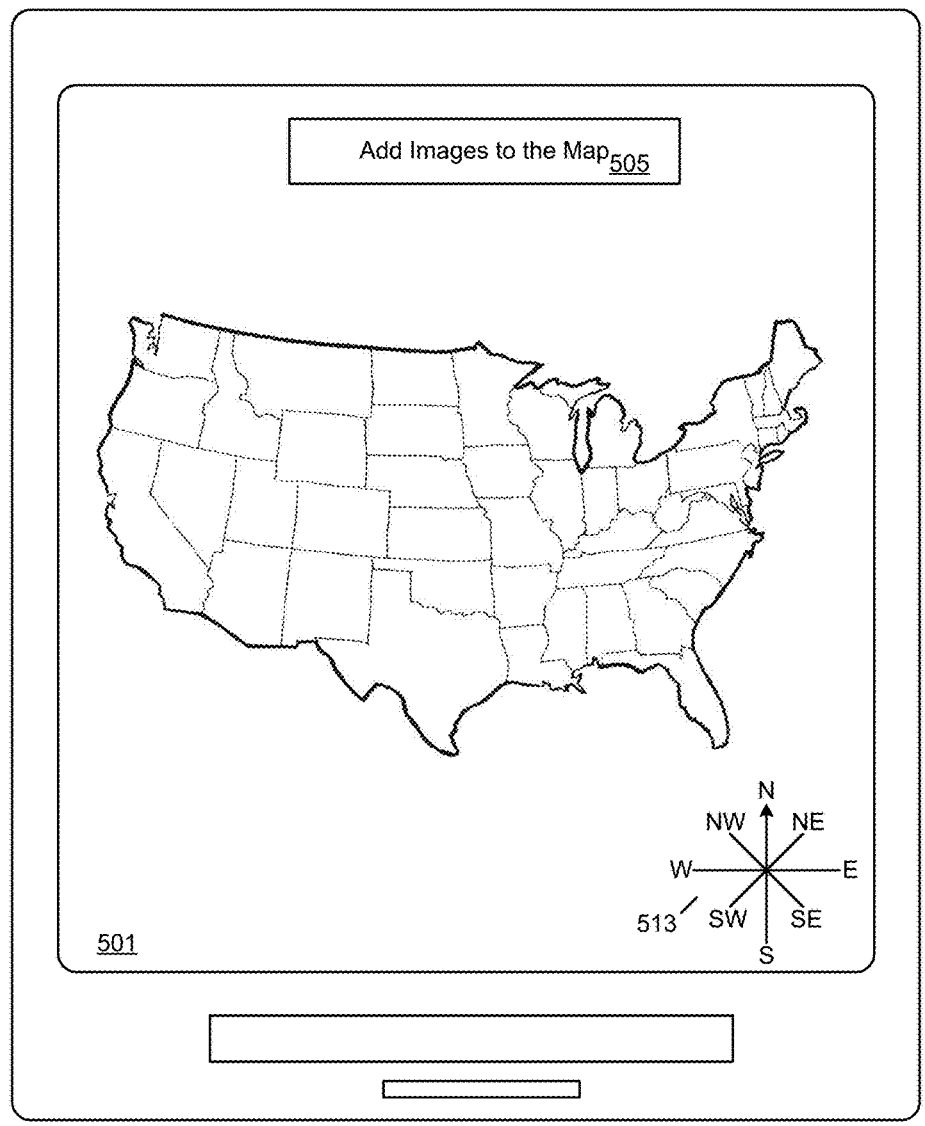
FIGS. 5-9 are illustrations of an example user interface for viewing a map, and for rendering images on the map based on orientations of the images and an orientation of the map.

FIG. 5 is an illustration of an example user interface 500 for viewing a map 140, and for rendering images 150 on the map 140 based on orientations 157 of the images 150 and an orientation of the map 140. The user interface 500 may be implemented by a map client 113 executing on a client device 110. As shown, the user interface 500 is displayed on a tablet computing device. However, the user interface 500 may also be displayed by other computing devices such as smartphones and desktop or laptop computers.

As shown in a window 501, a user is viewing a map 140. In the example shown, the map 140 is of the United States. The map 140 may have a low zoom level because the entire United States is visible. The viewing angle of the map 140 may be zero, because the map 140 is displayed without any perspective or tilt.

The window 501 also includes a compass 513 that indicates the orientation of the map 140. In the example shown, the compass 513 indicates that the map 140 has an orientation of "N" corresponding to the direction north. Also shown in the window 501 is a text box 505 instructing the user to "Add Images to the Map."

Figure 6:
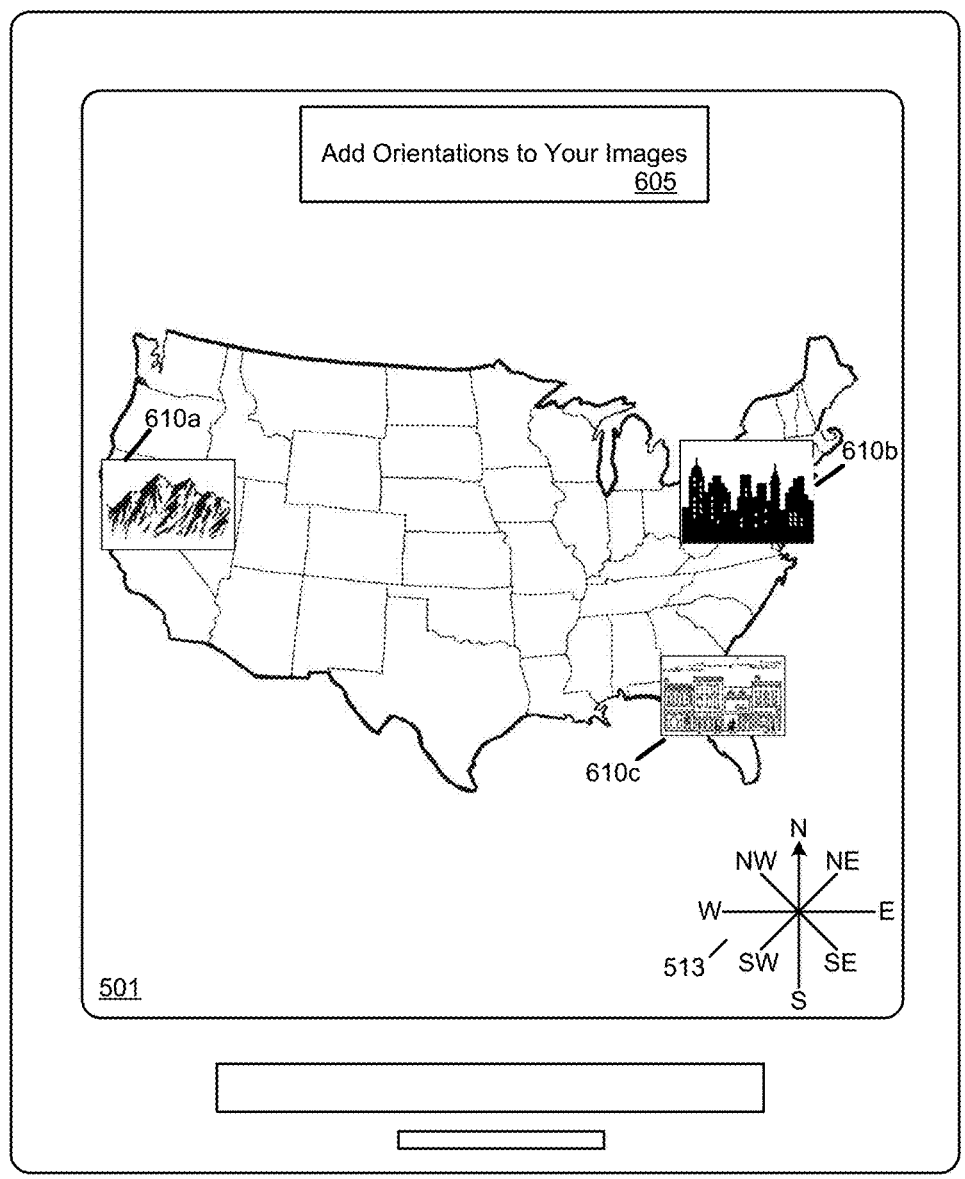

Continuing to FIG. 6, the user has added images 610 (i.e., the images 610*a*, 610*b*, and 610*c*) to the map 140. Depending on the implementation, the user may have selected the images 610, or the image engine 405 may have selected the images 610 for the user. For example, the image engine 405 may have selected the images 610 from a directory or location where the user stores photographs, and/or the image engine 405 may have selected the images 610 based on some criteria such as favorite images or most recent images.

As shown, each image 610 is rendered on the map 140 at a location 155 associated with the image 610. The locations 155 may have been provided by the user, or may have been determined by the image engine 405 from metadata associated with each image 610. Also shown in the window 501 is a text box 605 instructing the user to "Add Orientations to Your Images."

Figure 7:
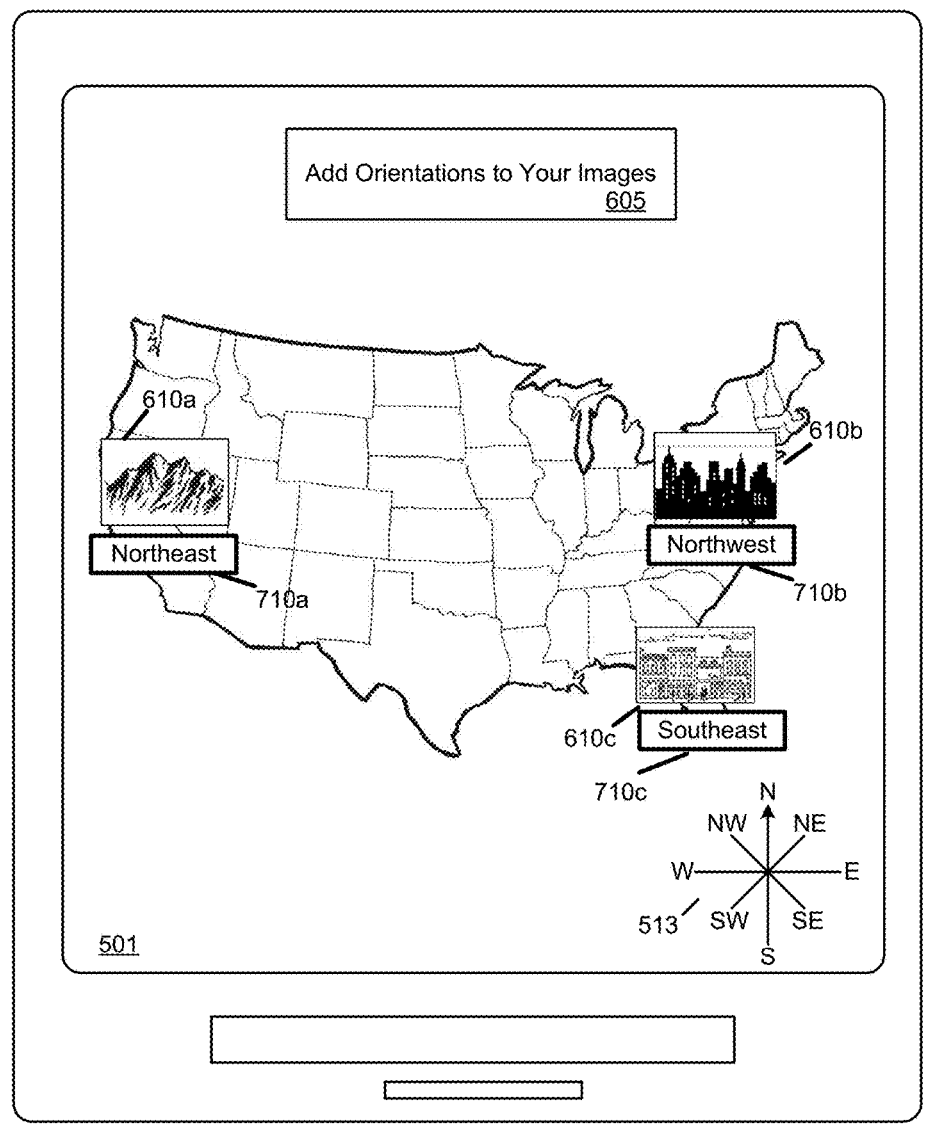

Continuing to FIG. 7, the user has provided orientations 710 for each of the images 610. In the example shown, the user has provided the orientation 710*a* of "Northeast" for the image 610*a*, the user has provided the orientation 710*b* of "Northwest" for the image 610*b*, and the user has provided the orientation 710*c* of "Southeast" for the image 610*c*. Alternatively, the orientation engine 415 may have determined the orientations 710 based on metadata associated with the images 610 (i.e., EXIF data).

Figure 8:
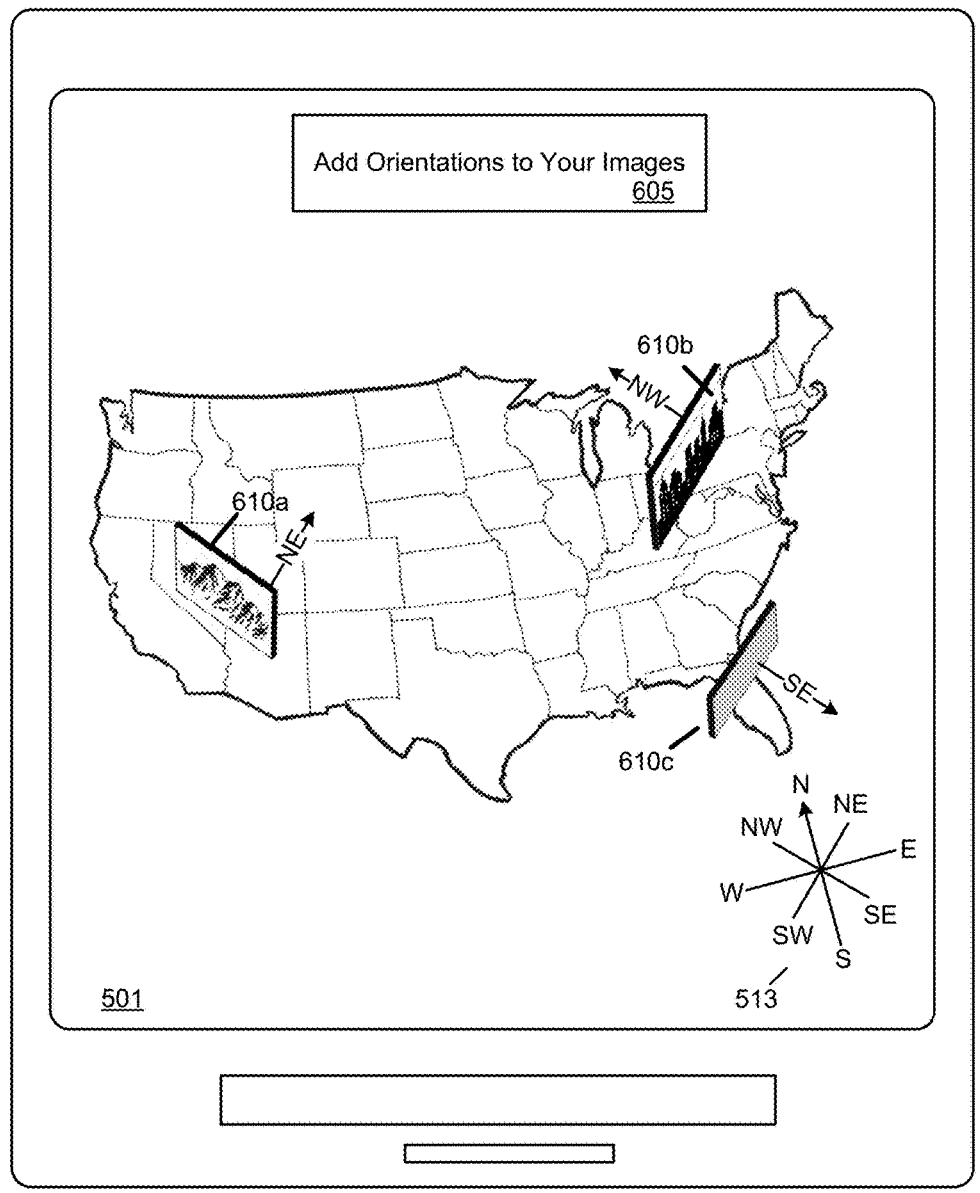

Continuing to FIG. 8, the images 610 are rendered on the map 140 according to the orientation 710 associated with each image 610. As shown by the compass 513, the map 140 has been rotated by the user and now has an orientation between north and northeast. Each of the images 610 is rendered on the map 140 based on its associated orientation 710 and the orientation of the map 140. In addition, each image 610 is rendered along with a direction arrow that indicates to the user the orientation 710 associated with the image. Depending on the implementation, the images 610 may be rendered in response to the user changing the viewing angle from 0 to some other value. For example, the user may have selected a user interface element to activate "perspective view."

In the example shown, the image 610*a* is rendered on the map 140 to appear to have the orientation 710*a* of "NE" or northeast. The image 610*b* is rendered on the map 140 to appear to have an orientation 710*b* of "NW" or northwest. The image 610*c* is rendered on the map 140 to appear to have an orientation 710*c* of "SE" or southeast. Because the images 610 are rendered with respect to the orientation of the map 140, each of the direction arrows matches a corresponding direction arrow of the compass 513 which is based on the orientation of the map 140.

As may be appreciated, the images 610 have been rendered based on a viewing angle of the map 140 to appear to be perpendicular to a surface of the map 140. Because of the viewing angle and the orientation of the map 140, only the rear of the image 610*c* which has an orientation of southeast is visible on the map 140. In the example shown, the rear of the image 610*c* is rendered to the user as a blank surface to indicate to the user that they may rotate the map 140 to view the image 610*c*. Alternatively, a reversal of the image 610*c* may be displayed to convey the same information to the user.

Each of the images 610 has further been rendered to appear to be displayed on a surface of a cuboid. Other types of shapes and/or surfaces may be used. While not shown, shadows, or other indicators of depth may be added to each image 610.

Figure 9:
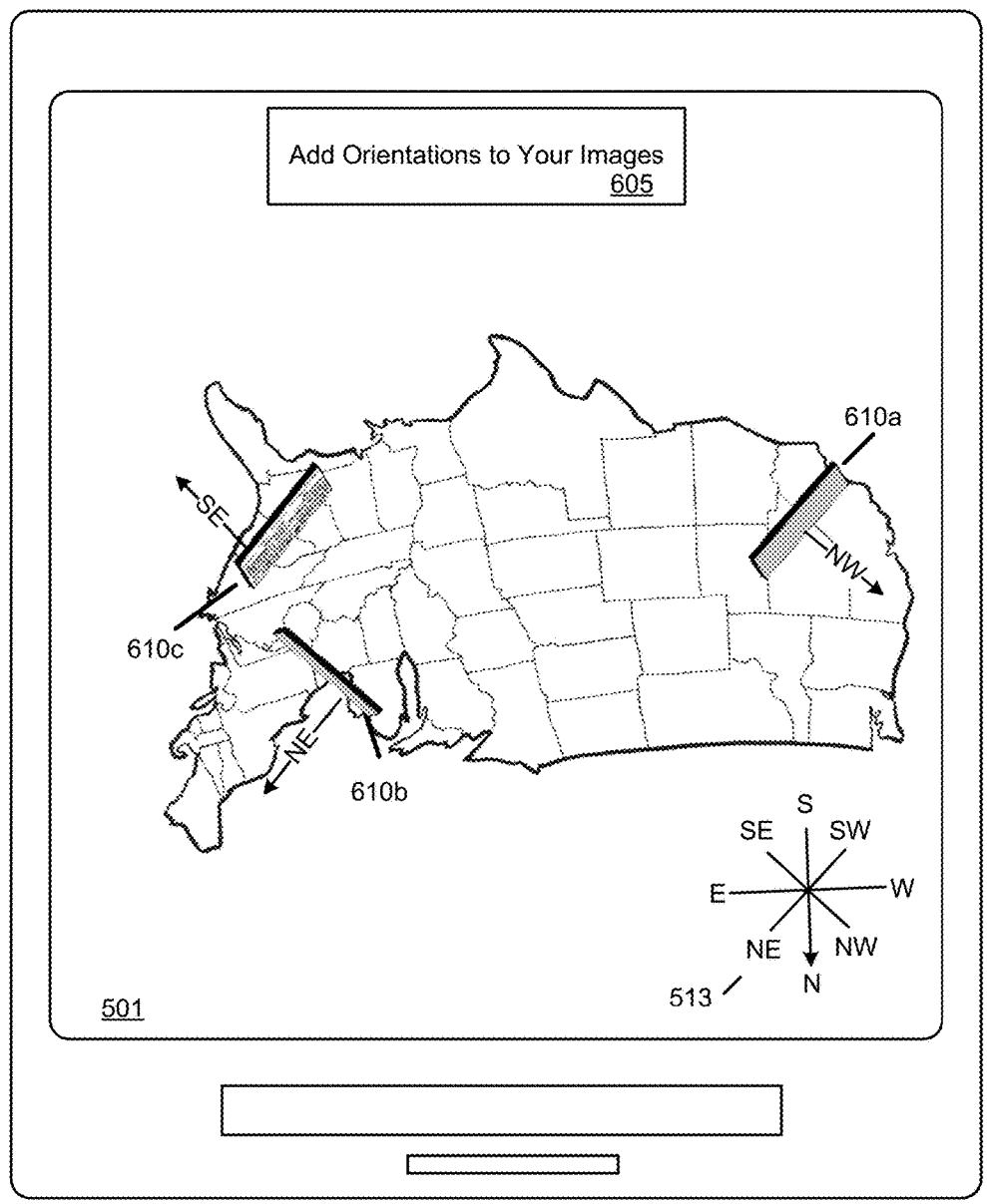

Continuing to FIG. 9, the user has rotated the map 140 and the images 610 have been re-rendered on the map 140 to account for the change in orientation of the map 140. According to the compass 513, the user has rotated the map 140 so that orientation of the map 140 is now south. Accordingly, the images 610 have been similarly rotated.

In the example shown, because the map 140 is now oriented south, the image 610*c* with the orientation of southeast is now visible on the map 140. Similarly, the image 610*a* with the orientation of northwest and the image 610*b* with orientation of northeast are no longer visible, and are rendered using blank surfaces.

Figure 10:
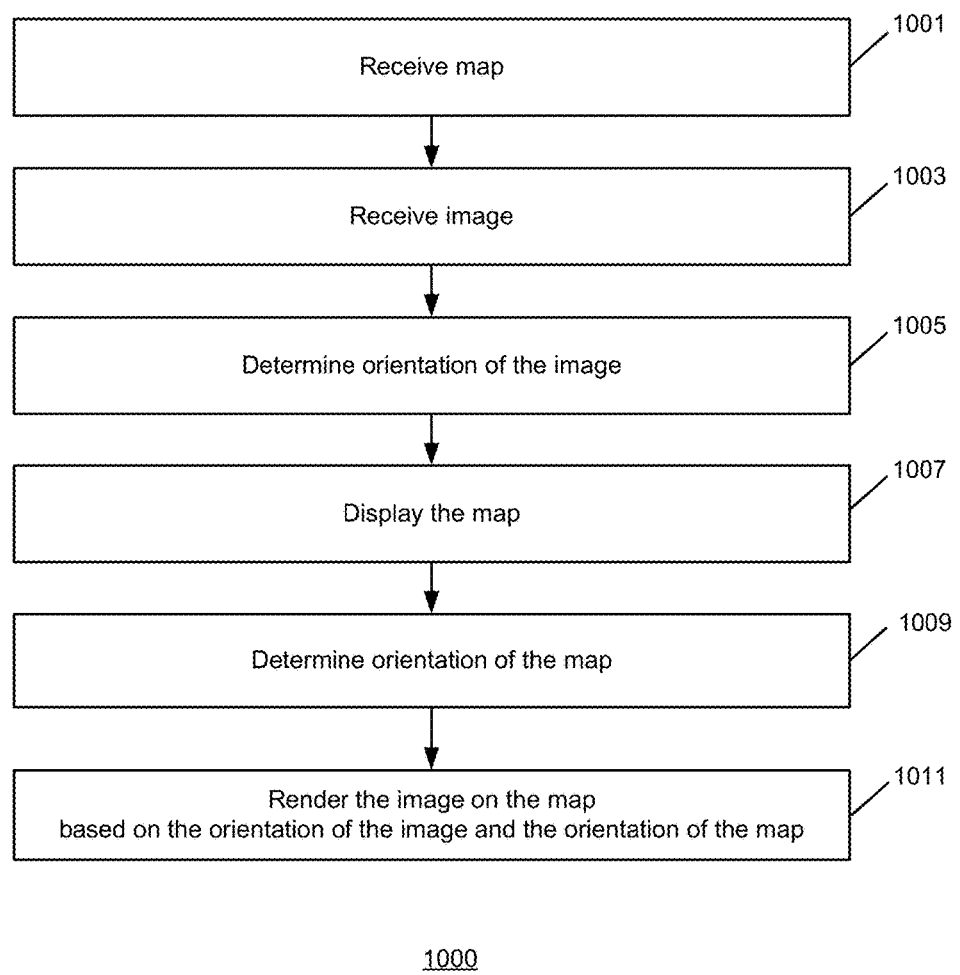
FIG. 10 is an operational flow of an implementation of a method for rendering an image on a map based on an orientation of the map and an orientation of the image.

FIG. 10 is an operational flow of an implementation of a method 1000 for rendering an image on a map based on an orientation of the map and an orientation of the image. The method 1000 may be implemented by the map engine 165 and/or the map client 113.

At 1001, a map is received. The map 140 may be received by the map client 113 and/or the map engine 165. The map 140 may include a plurality of locations. The map 140 may further include one or more map properties 145. The map properties 145 may include orientation, zoom level, and viewing angle.

At 1003, an image is received. The image 150 may be received by the image engine 405 of the map engine 165.

The image 150 may be a photograph. Other types of images 150 may be supported. The image 150 may be an image that is associated with a user of the map client 113, or that was selected by the user associated with the map client 113.

The image 150 may be associated with a location 155. The location 155 may be a location on the map 140. The location 155 may represent the location 155 on the map 140 where the scene or object captured by the image 150 may be visible to a user. Where the image 150 is a photograph, the location 155 may be the location where the photographer was located at when the image 150 was captured. The location 155 of the image 150 may be specified by the user associated with the map client 113. Alternatively, the location of the image 150 may be specified in metadata associated with the image 150 such as EXIF data.

At 1005, an orientation of the image is determined. The orientation 157 of the image 150 may be determined by the orientation engine 415 of the map engine 165. The orientation 157 of the image 150 may be the direction that the photographer associated with the image 150 was facing when they took the image 150. As another example, the orientation 157 of the image 150 may be the direction that the scene captured or depicted in the image 150 is viewable from at the location 155 associated with the image 150.

In some implementations, the orientation 157 may be determined based on metadata associated the image such as EXIF data. The EXIF data may indicate the direction that a camera was facing when the image 150 was taken. In other implementations, visual characteristics of the image 150 may be used to determine the orientation 157. For example, the visual characteristics such as objects or landmarks in the image 150 may be compared with images 150 that have known orientations 157 and are associated with the same location 155. In another example, the visual characteristics may indicate the direction and/or position of the sun, which may be used to determine the orientation 157. In still other implementations, the orientation engine 415 may prompt the user to provide the orientation 157, or may ask the user to confirm an orientation 157 determined based on visual characteristics.

At 1007, the map is displayed. The map 140 may be displayed on a display associated with the client device 110 of the user associated with the map client 113. The map 140 may be displayed by the rendering engine 420 of the map engine 165.

At 1009, an orientation of the map is determined. The orientation of the map 140 may be determined by the rendering engine 420. Depending on the implementation, the orientation of the map 140 may be the direction that is normal or perpendicular to a top of the display that is used to view the map 140. For example, if the cardinal direction northwest on the map 140 is normal to the top of the display, then the orientation of the map 140 may be northwest. The user may change the orientation of the map 140 by rotating the map using one or more user interface elements associated with the map client 113, or by providing one or more gestures recognized by the map client 113.

At 1011, the image is rendered on the map based on the orientation of the image and the orientation of the map. The image 150 may be rendered on the map by the rendering engine 420. The image 150 may be rendered on the map 140 such that the surface or face of the image 150 is most visible in the direction corresponding to the orientation 157 of the image 150. Depending on the implementation, the image 150 may be rendered on the map like a "billboard" that is most visible when the map 140 has the same orientation 157 as the image 150. The relative size of the rendered image 150 on the map 140 may be based on user settings, the resolution of the image 150, and map properties 145 such as viewing angle and zoom level, for example.

Figure 11:
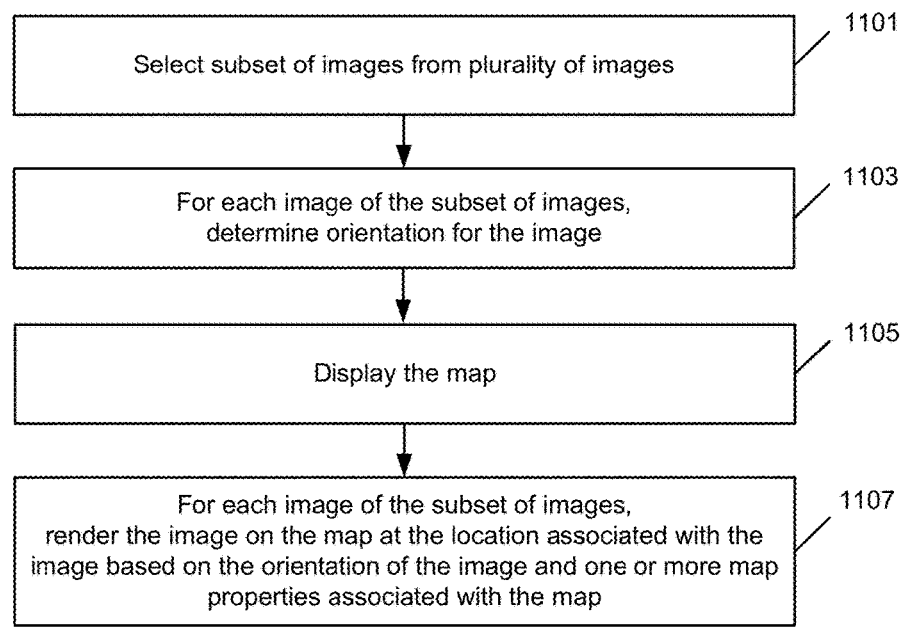
FIG. 11 is an operational flow of an implementation of a method for selecting images and for rendering the selected images on a map based on map properties associated with the map and orientations of the selected images.

FIG. 11 is an operational flow of an implementation of a method 1100 for selecting images and for rendering the selected images on a map based on map properties associated with the map and orientations of the selected images. The method 1100 may be implemented by the map engine 165 and/or the map client 113.

At 1101, a subset of images is selected from a plurality of images. The subset of images may be selected by the image engine 405 of the map engine 165. Each image 150 may be associated with a location 155. The plurality of images may be images 150 that are associated with a user. For example, the plurality of images 150 may be images 150 that were taken by the user or that are part of an image 150 collection associated with the user. Alternatively, the plurality of images 150 may be images 150 that are associated with friends or contacts of the user, or images 150 that are responsive to a query associated with the user. For example, the user may have generated a query "snow", and the plurality of images 150 may be images 150 associated with the user (and/or contacts) that include snow or have been tagged as including snow.

Because of the limited number of locations that are visible on the map 140, the image engine 405 may select the subset of images 150 from the plurality of images 150 by selecting images 150 that have an associated location 155 that is visible on the map 140. For example, if the map 140 is a map of New York state, the image engine 405 may select images 150 that are located in New York state. Alternatively or additionally, the image engine 405 may select the images 150 for the subset based on map properties 145 such as zoom level. Depending on the implementation, the image engine 405 may also rank the images 150 based on user preferences, and may select the images 150 for the subset based on the rankings.

At 1103, for each image in the subset of images, an orientation for the image is determined. The orientation 157 of each image 150 may be determined by the orientation engine 415 of the map engine 165. The orientation 157 of each image 150 may be determined based on metadata associated with each image 150, or based on visual characteristics of each image 150.

At 1105, the map is displayed. The map 140 may be displayed on a display associated with the client device 110 of the user associated with the map client 113. The map 140 may be displayed by the rendering engine 420 of the map engine 165. The map 140 may be displayed according to one or more map properties 145 associated with the map 140. The map properties 145 may include orientation, viewing angle, and zoom level. Other map properties 145 may be supported.

At 1107, for each image of the subset of images, the image is rendered on the map at the location associated with the image based on the orientation of the image and one or more map properties associated with the map. The images 150 may be rendered by the orientation engine 157 of the map engine 165. As described above, each image 150 may be rendered to appear to rise from, or float above, the surface of map 140 at the location 155 associated with the image 150.

With respect to the map property 145 of the orientation of the map 140, each image 150 may be rendered based on the orientation 157 of the image 150 relative to the orientation of the map. With respect to the map property 145 of viewing angle, each image may be rendered to appear substantially perpendicular to the surface of the map 140 on the display of the computing device. With respect to the map property 145 of the zoom level, the zoom level selected by the user may affect how large the image 150 is rendered on the map 140. When a high zoom level is used (indicating that the user is close), the image 150 may be rendered larger than when a low zoom level is used (indicating that the user is far away).

Figure 12:
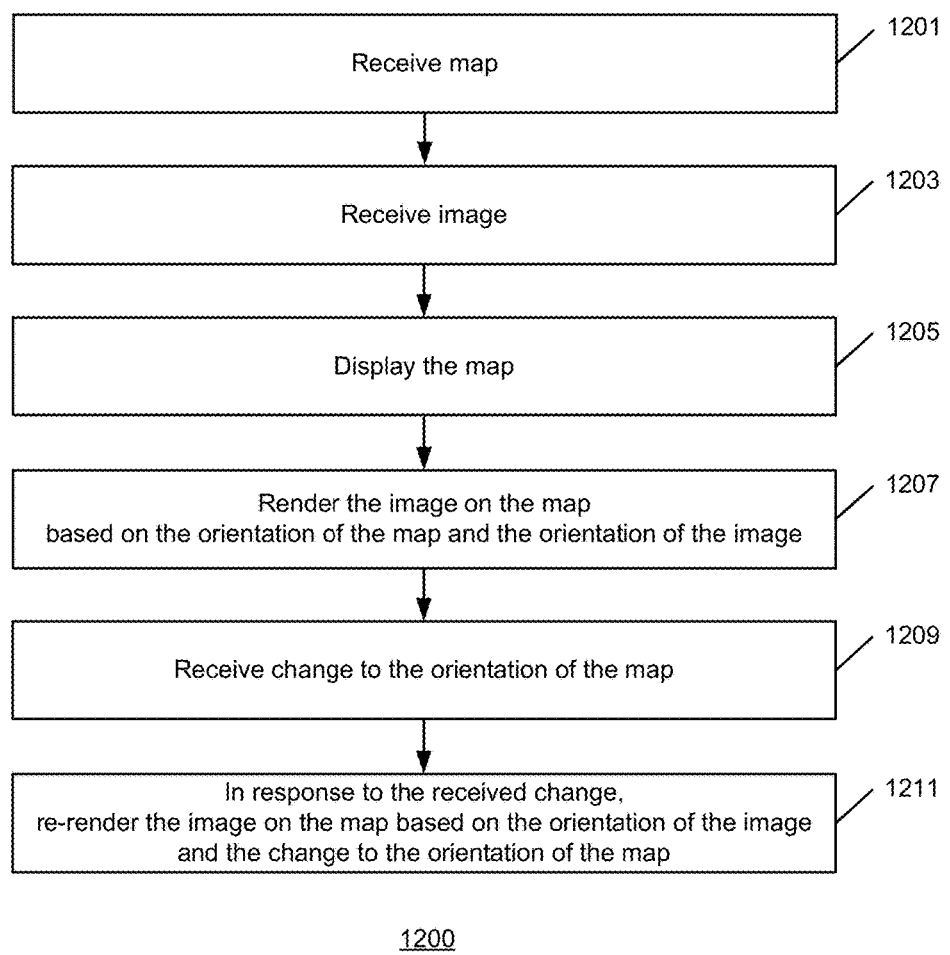
FIG. 12 is an operational flow of an implementation of a method for rendering an image on a map based on an orientation associated with the map and an orientation of the image, and for re-rendering the image based on a change to the orientation of the map.

FIG. 12 is an operational flow of an implementation of a method 1200 for rendering an image on a map based on an orientation associated with the map and an orientation of the image, and for re-rendering the image based on a change to the orientation of the map. The method 1200 may be implemented by the map engine 165 and/or the map client 113.

At 1201, a map is received. The map 140 may be received by the map client 113 and/or the map engine 165. The map 140 may include a plurality of locations. The map 140 may further include one or more map properties 145. The map properties 145 may include orientation, zoom level, and viewing angle.

At 1203, an image is received. The image 150 may be received by the image engine 405 of the map engine 165. The image 150 may be a photograph. Other types of images 150 may be supported. The image 150 may be an image that is associated with a user of the map client 113, or an image that was selected by the user associated with the map client 113. The image 150 may be associated with a location 155 and an orientation 157.

At 1205, the map is displayed. The map 140 may be displayed on a display associated with the client device 110 of the user associated with the map client 113. The map 140 may be displayed by the rendering engine 420 of the map engine 165.

At 1207, the image is rendered on the map based on the orientation of the image and the orientation of the map. The image 150 may be rendered on the map 140 by the rendering engine 420. The image 150 may be rendered on the map 140 such that the surface or face of the image 150 is most visible in the direction corresponding to the orientation 157 of the image 150.

At 1209, a change to the orientation of the map is received. The change to the orientation of the map 140 may be received by the rendering engine 420. Depending on the implementation, the user may have changed the orientation of the map 140 by rotating the map using the map client 113. For example, the user may make a gesture with respect to the display of the client device 110 to rotate the image 150 in either the clockwise or the counterclockwise direction. Depending on the implementation, a change may be received for other map properties 145. For example, the user may change the viewing angle or zoom level used to view the map 140.

At 1211, the image is re-rendered on the map based on the orientation of the image and the change to the orientation of the map. The image 150 may be re-rendered on the map 140 by the rendering engine 420. The image 150 may be re-rendered on the map 140 by rotating the image 150 in an amount that is equivalent to the change in the orientation of the map 140. For example, if the orientation of the map 140 was changed by rotating the map 140 30 degrees in the counterclockwise direction, then the image 150 may be re-rendered by rotating the image 150 30 degrees in the counterclockwise direction.

If a change is received for other map properties 145, the image 150 may similarly be re-rendered to reflect the changes. For example, if the change is to the viewing angle, the image 150 may be skewed or adjusted so that the image 150 continues to appear to be perpendicular to the surface of the map 140 at the new viewing angle. If the change is to the zoom level, the size of the image 150 may be increased or decreased proportionally to the change in the zoom level.

FIG. 13 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of computer readable media. Computer readable media can be any available media that can be accessed by the device 1300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communication connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for determining the orientation of an image and for rendering the image on a map based on the determined orientation and an orientation of the map is provided. The system includes at least one computing device and a map engine. The map engine may be adapted to: receive a map; receive an image, wherein the image is associated with a location on the map; determine an orientation of the image; display the map on a display associated with the at least one computing device; determine an orientation of the displayed map; and render the image on the displayed map at the associated location based on the orientation of the image and the orientation of the displayed map.

Implementations may include some or all of the following features. The map engine adapted to determine the orientation of the image may include the map engine adapted to request the orientation of the image from a user. The map engine adapted to determine the orientation of the image may include the map engine adapted to determine the orientation of the image based on visual characteristics of the image. The map engine adapted to determine the orientation of the image may include the map engine adapted to determine the orientation of the image based on metadata associated with the image. The metadata may include EXIF data. The map engine may be further adapted to: receive a change to the orientation of the displayed map; and in response to the received change to the orientation of the displayed map, re-render the image on the displayed map at the associated location based on the orientation of the image and the change to the orientation of the displayed map. The displayed map may be associated with a viewing angle and a zoom level, and the map engine may be further adapted to render the image on the displayed map at the associated location based on the orientation of the image, the orientation of the displayed map, the viewing angle, and the zoom level. The displayed map may include a surface, and the image may be rendered to appear perpendicular to the surface of the displayed map. The image may be a photograph and the orientation of the image may be a direction that a photographer associated with the image was facing when the image was captured by the photographer.

In an implementation, a system for determining orientations for images and for rendering the images on a map based on the determined orientations is provided. The system may include at least one computing device and a map engine. The map engine may be adapted to: select a subset of images from a plurality of images, wherein each image of the plurality of images is associated with a location; for each image of the subset of images, determine an orientation for the image; display a map on a display associated with the at least one computing device, wherein the map is associated with an orientation and the map is associated with a plurality of locations; and for each image of the subset of images, render the image on the map at the location associated with the image based on the orientation of the image and the orientation of the map.

Implementations may include some or all of the following features. The map engine adapted to select the subset of images from the plurality of images may include the map engine adapted to select the subset of images from the plurality of images based on the location associated with each image and the plurality of locations associated with the map. The map may be associated with a zoom level, and the map engine adapted to select the subset of images from the plurality of images may include the map engine adapted to select the subset of images from the plurality of images based on the zoom level. The map engine may be further adapted to: receive a change to the orientation of the map; and in response to the received change to the orientation of the map, for each image of the subset of images, re-render the image on the map at the location associated with the image based on the orientation of the image and the received change to the orientation of the map. The map may include a surface, and each image may be rendered to appear perpendicular to the surface of the map. The map may be associated with a viewing angle and a zoom level, and the map engine may be further adapted to render each image on the map at the location associated with the image based on the orientation of the image, the orientation of the map, the viewing angle, and the zoom level. The map engine adapted to determine the orientation of the image may include the map engine adapted to determine the orientation of the image based on visual characteristics of the image. The map engine adapted to determine the orientation of the image may include the map engine adapted to determine the orientation of the image based on metadata associated with the image.

In an implementation, a method for rendering an image on a map based on an orientation associated with the image is provided. The method includes: receiving a map by a computing device; receiving an image by the computing device, wherein the image is associated with an orientation and a location on the map; displaying the map on a display by the computing device, wherein the displayed map is associated with an orientation; rendering the image on the displayed map at the associated location based on the orientation of the image and the orientation of the displayed map by the computing device; receiving a change to the orientation of the displayed map by the computing device; and in response to the received change to the orientation of the map, re-rendering the image on the map at the associated location based on the orientation of the image and the change to the orientation of the displayed map by the computing device.

Implementations may include some or all of the following features. The displayed map may be associated with a viewing angle and a zoom level. The method may further include rendering the image on the displayed map at the associated location based on the orientation of the image, the orientation of the displayed map, the viewing angle, and the zoom level. The displayed map may include a surface, and the image may be rendered to appear perpendicular to the surface of the displayed map.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for determining the orientation of an image and for rendering the image on a map based on the determined orientation and an orientation of the map, the system comprising:
    at least one computing device; and
    a map engine adapted to:
        receive a map;
        receive an image, wherein the image is associated with a location on the map;
        determine an orientation of the image;
        display the map on a display associated with the at least one computing device;
        determine an orientation of the displayed map; and
        render the image on the displayed map at the associated location, the image defined within an image plane bounded by a border, both the border and the image plane being rendered to appear perpendicular to the displayed map based on a viewing angle of the displayed map and further rendered to be facing a select cardinal direction based on the determined orientation of the image and the determined orientation of the displayed map.

2. The system of claim 1, wherein the map engine adapted to determine the orientation of the image comprises the map engine adapted to request the orientation of the image from a user.

3. The system of claim 1, wherein the map engine adapted to determine the orientation of the image comprises the map engine adapted to determine the orientation of the image based on visual characteristics of the image.

4. The system of claim 1, wherein the map engine adapted to determine the orientation of the image comprises the map engine adapted to determine the orientation of the image based on metadata associated with the image.

5. The system of claim 4, wherein the metadata comprise EXIF data.

6. The system of claim 1, wherein the map engine is further adapted to:
    receive a change to the orientation of the displayed map; and
    in response to the received change to the orientation of the displayed map, re-render the image on the displayed map at the associated location based on the orientation of the image and the change to the orientation of the displayed map.

7. The system of claim 1, wherein the displayed map is associated with a viewing angle and a zoom level, and the map engine is further adapted to render the image on the displayed map at the associated location based on the orientation of the image, the orientation of the displayed map, the viewing angle, and the zoom level.

8. The system of claim 1, wherein the image is a photograph and the orientation of the image is a direction that a photographer associated with the image was facing when the image was captured by the photographer.

9. A system for determining orientations for images and for rendering the images on a map based on the determined orientations, the system comprising:
    at least one computing device; and
    a map engine adapted to:
        select a subset of images from a plurality of images, wherein each image of the plurality of images is associated with a location;
        for each image of the subset of images, determine an orientation for the image;
        display a map on a display associated with the at least one computing device, wherein the map is associated with an orientation and the map is associated with a plurality of locations; and
        for each image of the subset of images, render the image on the map at the location associated with the image, the image defined within an image plane bounded by a border, both the border and the image plane rendered to appear perpendicular to the displayed map based on a viewing angle of the displayed map and further rendered to be facing a select cardinal direction based on the determined orientation of the image and the orientation of the map.

10. The system of claim 9, wherein the map engine adapted to select the subset of images from the plurality of images comprises the map engine adapted to select the subset of images from the plurality of images based on the location associated with each image and the plurality of locations associated with the map.

11. The system of claim 9, wherein the map is associated with a zoom level, and the map engine adapted to select the subset of images from the plurality of images comprises the map engine adapted to select the subset of images from the plurality of images based on the zoom level.

12. The system of claim 9, wherein the map engine is further adapted to:
    receive a change to the orientation of the map; and
    in response to the received change to the orientation of the map, for each image of the subset of images, re-render the image on the map at the location associated with the image based on the orientation of the image and the received change to the orientation of the map.

13. The system of claim 9, wherein the map is associated with a viewing angle and a zoom level, and the map engine is further adapted to render each image on the map at the location associated with the image based on the orientation of the image, the orientation of the map, the viewing angle, and the zoom level.

14. The system of claim 9, wherein the map engine adapted to determine the orientation of the image comprises the map engine adapted to determine the orientation of the image based on visual characteristics of the image.

15. The system of claim 9, wherein the map engine adapted to determine the orientation of the image comprises the map engine adapted to determine the orientation of the image based on metadata associated with the image.

16. A method for rendering an image on a map based on an orientation associated with the image, the method comprising:
- receiving a map by a computing device;
- receiving an image by the computing device, wherein the image is associated with an orientation and a location on the map;
- displaying the map on a display by the computing device, wherein the displayed map is associated with an orientation;
- rendering the image on the displayed map at the associated location, the image defined within an image plane bounded by a border, both the border and the image plane rendered to appear perpendicular to the displayed map based on a viewing angle of the displayed map and further rendered to be facing a select cardinal direction based on the orientation of the image and the orientation of the displayed map by the computing device;
- receiving a change to the orientation of the displayed map by the computing device; and
- in response to the received change to the orientation of the map, re-rendering the image on the map at the associated location based on the orientation of the image and the change to the orientation of the displayed map by the computing device.

17. The method of claim 16, wherein the displayed map is associated with a viewing angle and a zoom level, and further comprising rendering the image on the displayed map at the associated location based on the orientation of the image, the orientation of the displayed map, the viewing angle, and the zoom level.

* * * * *